June 2, 1970  H. A. ROSSEN  3,514,857
CHEESE MOULDING APPARATUS

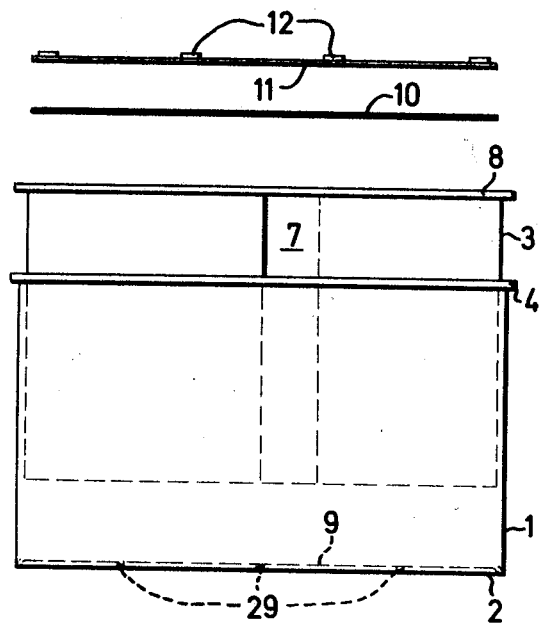
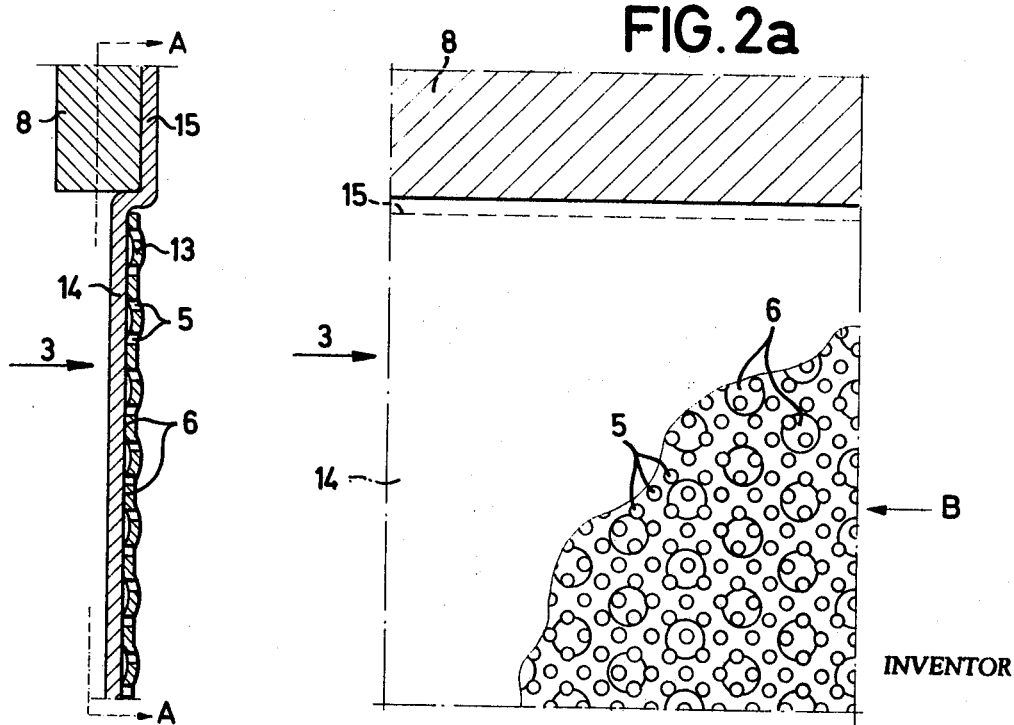

Filed May 5, 1967  2 Sheets-Sheet 2

INVENTOR
HANS ANDREAS ROSSEN

BY Stevens, Davis, Miller & Mosher

ATTORNEYS

United States Patent Office 3,514,857
Patented June 2, 1970

3,514,857
CHEESE MOULDING APPARATUS
Hans Andreas Rossen, Gram, Tiset Province, Denmark
Continuation-in-part of application Ser. No. 417,413,
Dec. 10, 1964. This application May 5, 1967, Ser.
No. 636,369
Int. Cl. A01j 25/13; B28b 7/36
U.S. Cl. 31—44   5 Claims

ABSTRACT OF THE DISCLOSURE

A cheese mould of the type having a slit mould wall or shell slideable into the interior of an outer mould. Said shell is composed of at least two juxtaposed and interconnected, thin plates of which at least the interior one is finely perforated. Between said plates are regularly distributed low elevations.

---

Figure 3:
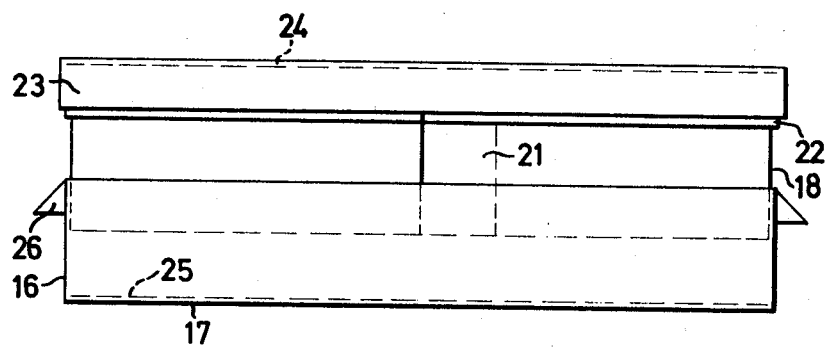

This application is a continuation-in-part of my U.S. patent application Ser. No. 417,413, filed on Dec. 10, 1964, now abandoned.

The invention relates to a cheese mould comprising an outer mould portion and a detachable slit inner mould portion—a shell—which fits into said outer mould portion, or more such inner mould portions, and which comprises a finely perforated plate material.

In the known moulds of this type the shell consists of a single finely perforated plate whose outer side facing the outer mould portion is provided with low regularly distributed elevations. Such finely perforated plate with elevations is used in place of the well known cheese cloth. When using the latter, the whey is during the pressing operation drained off along the fibers in the cloth. When using the first, the whey is drained off through the fine perforation holes and the space left between the perforated plate and the unperforated outer mould wall, and which space is provided by the said elevations functioning as spacers. Out of regard for the production of the fine perforations and also out of regard for the production of said elevations by an embossing process, a comparatively thin plate material has been used. While this for one thing facilitates the production of the fine perforation holes and the production of the low elevations by an embossing process, this is for another thing encumbered with certain drawbacks with respect to the practical use thereof in the cheese factories or creameries. During the various handlings of the cheese mould, for example, when turning the cheese, or while cleaning the mould, the shell is often exposed to rough treatment which may result in the occurrent of dents in the shell and bending of its edges, and such dented or bent shell is no longer applicable for its purpose.

This drawback has been removed in the cheese mould according to the present invention which is characterised in that the shell comprises two juxtaposed and rigidly interconnected plates having intermediate evenly distributed low elevations projecting from at least one of said plates, and of which plates at least the one facing the interior of the mould is finely perforated.

Without the advantage of the thin plate for the fine perforation being waived, this structure affords protection of said finely perforated plate against the rough mechanical influences to which it may be exposed during service in the cheese factories or creameries. It would even be possible to make the perforated plate thinner than would otherwise be normal and thus facilitate the production of the very fine perforation holes.

The said reinforced shell may be carried out in different ways. Thus, it may for example be made up of a smooth perforated plate facing the interior of the shell, and a plate which surrounds said perforated plate and which at the side facing the perforated shell is provided with said low elevations. The latter outer plate as such may be perforated but is preferably not perforated. However, according to the invention the shell consists preferably of a combination of an inner finely perforated plate the outer face of which is provided with evenly distributed low elevations, and an outer non-perforated plate. Thus, such shell is made up of a shell of the known type and said outer non-perforated plate. This latter plate might also be provided with elevations of the type mentioned, but this would involve no advantage in connection with the embodiment described and, consequently, the plate is preferably a smooth plate.

There would be nothing to prevent the shell from being made up of a plurality of plates in that for the proper service of the shell it is only of material importance that the plate facing the interior of the shell is finely perforated, and that either said inner plate or the outer plate surrounding and engaging said inner plate is provided with the said low elevations. The use of more than two plates of this type will only serve for making the shell heavier than necessary, and consequently, more unhandy.

The plates may be integrally interconnected by spot welding, preferably along the edge of the inner perforated plate, or by any other procedure known per se.

The cheese mould with the shell may otherwise be designed as described and shown in the U.S. patent specification No. 3,118,229, especially with regard to number and size of perforation holes, and to elevations.

Figure 4:
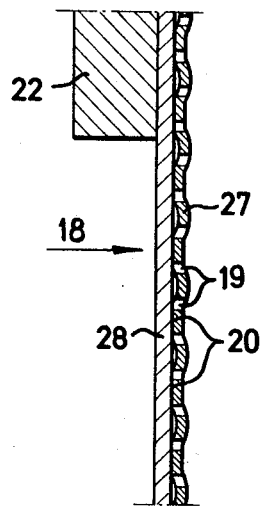

The invention will be explained in detail in the following in connection with the examples of cheese moulds according to the invention illustrated in the drawing. In the drawing:

FIG. 1 illustrates diagrammatically a front view of an embodiment of a cheese mould according to the present invention, with the shell pushed only partly down into the mould, and with raised covering plate and pressing lid, FIG. 2 illustrates on a large scale and in cross-section part of an embodiment of a shell for use in a cheese mould as shown in FIG. 1, FIG. 2a illustrates a section, taken along the line A—A, of the part of shell shown in FIG. 2, with part of the front plate broken away as indicated by B, FIG. 3 illustrates a front view of another embodiment of the cheese mould with the shell, with a lid on, pushed only partly down into the mould, and FIG. 4 illustrates on a large scale and in cross-section an embodiment of the shell for the cheese mould in FIG. 3.

The mould in FIG. 1 has an outer wall 1 and a bottom 2 which may conveniently be made of a metal such as stainless steel. The outer wall has at the upper edge a reinforcing ring 4, and in the edge formed by mould wall 1 and bottom 2 there is provided whey discharge holes 29 having a diameter of, for example, about 5 mm. The shell 3, the construction of which is seen in detail in FIG. 2 and FIG. 2a, comprises an inner perforated plate 13 and an outer smooth non-perforated plate 14 which at top is bent to form an edge 15. The plate 13 is provided with perforation holes indicated at 5 and regularly distributed elevations, indicated at 6, having been imparted to the outer side of said plate by embossing. The diameter of the perforation holes may preferably be about 0.8 mm. or less, and the number of such holes may be, for example, 20 to 30 or more per cm.$^2$ of the plate, and the elevations may be of a height, for example, of from ½ to 1 mm. The ends 7 of the shell overlap each other when the shell is inserted into the mould. The shell is provided with an upper reinforcing split ring 8 which, when the shell has been pushed fully into mould, can rest on the reinforcing ring 4 of the outer wall. The shell is provided with a perforated loose bottom plate indicated at 9, and a similar covering plate 10 which may slide down into the interior of the shell when this is inserted into the mould. The perforation of the said bottom and covering plate is preferably similar to the perforation provided in the perforated plate 13 of the shell, as mentioned above. They are also preferably embossed in a similar manner. The mould is furthermore provided with a pressing lid 11 of material similar to the material of the outer wall, and provided with reinforcing ribs 12. This pressing lid can also during pressing slide down into the upper part of the shell in close contact with the interior surface of the shell. For the sake of convenience, thickness of plates (such as 10 and 11) and size of holes are shown in somewhat exaggerated scale.

The plate 14 shown in FIG. 2 and 2a is by spot welding integrally connected with the upper edge of plate 13 and similarly with the lower edge (not shown) of the same plate. The reinforcement ring 8 is disposed around the edge 15 and preferably has been secured to said edge by welding. The total thickness of the plates 13 and 14 may, for example, be from 1 to 1½ mm. In FIG. 2a the elevations are shown to be round in shape, but they may have any other shape, such as oblong, oval, triangular etc., as indicated in the U.S. specification No. 3,118,229. Likewise, the holes may have any other shape than round.

The mould shown in FIG. 3 has an outer wall 16 and a bottom 17. The shell 18, the construction of which is as illustrated in FIG. 4, comprises an outer plate 28 and an inner perforated plate 27 with perforation holes indicated at 19 and low, regularly distributed elevations indicated at 20. As is the case with the embodiment mentioned above, the shell 18 has mutually overlapping edges 21. Around the upper edge of the shell there is a split reinforcing edge 22 which, if during the pressing operation the shell is pressed right down into the mould, can rest on the upper edge of the outer wall 16. The mould is furthermore provided with a lid 23, on the inner side of which a covering plate 24 is laid, which plate is perforated and preferably embossed like the perforated plate of the shell, shown in detail in FIG. 4. Said covering plate may be secured to the lid or preferably be loosely mounted. A similar plate 25 is disposed on the bottom of the mould. With a view to cleaning, this plate is also preferably loosely mounted. The mould is moreover provided with a handle or other carrying member 26. When filling this mould with cheese mass prior to pressing thereof, the shell 18 usually is pushed only partly down into the outer mould. Due to the fact that the split shell is springy, it presses against the interior surface of the outer wall 16 to such degree that it can be held in the interior of the outer mould, with its lowermost edge at any desired level above the bottom, without the use of special supports. When sufficient cheese mass is filled into the mould to secure that the cheese after being properly pressed, completely fills out the mould, covering plate 24 and pressing lid 23 is placed on tip of the shell, and wehn pressing, the shell slides further down into the outer mould.

As shown in detail in FIG. 4 the shell 18 is very similar to the one shown in FIG. 2, except that the perforated plate 27 extends to the upper edge of the non-perforated plate 28. The perforation holes 19 and elevations 20 are similar to those of shell 3 shown in detail in FIG. 2.

The perforated bottom and covering plates 9, 10, and 24, 25 may, if so desired, also be reinforced in a manner similar to that of the said shell member, but this is, however, not quite so important as in the case of the shell shell member because said bottom and covering plates are not quite to the same extent exposed to injury.

The operation of the mould as shown in FIG. 1 is as follows: The bottom plate is placed on the bottom 2 of the outer mould, and the shell 3 is inserted with its lower edge resting on bottom 2. Then cheese mass to be pressed is filled into the mould in a predetermined amount, i.e. normally up to about the level of the upper edge of the mould, covering plate 10 is placed on top of the cheese mass, and pressing lid 11 is placed on said covering plate. Next, the mould is placed with its lid beneath the plunger of a pressing cylinder in a conventional pneumatic cheese press, for example, a multi-cylinder press as manufactured and sold by the Danish firm Perfora v/H. Rossen & Co. The pressing operation usually vary somewhat according to the type of cheese to be pressed, and according to the special practice of the cheese factory. As an example, pressing of cheddar cheese may be mentioned, wherein a pressure of about 1 kg./cm.$^2$ is conveniently applied to the pressing lid, and hence to the upper surface of the cheese mass. As pressing lid 11 and covering plate 10 under pressure move down into the interior of shell 3, whey drains off through perforation holes 5, pass between the non-perforated plate 14 and perforated and embossed plate 13, between bottom plate 9 and bottom 2, between covering plate 11 and pressing lid 12, and then leaves partly through discharge holes 29 and partly by passing to the space above the pressing lid. From the latter space at least part of the whey will at once be forced to pass the upper edge of the mould, and any rest will be removed after the end of the pressing operation. Sufficient space between plates 13 and 14, plates 9 and bottom 2, and plate 10 and lid 11, respectively, is created by the afore-mentioned low elevations 6, thus functioning as spacers.

The above-mentioned pressure is maintained for about 7 hours. Then the pressure is released, the mould is removed from the press and turned upside down, and the outer mould and bottom plate 9 is removed from the shell 3 with its contents of pressed cheese, plate 10 and lid 11. Shell 3 may then be removed from the cheese by first opening it a little, cfr. the overlapping ends 7.

The operation of the mould as shown in FIG. 3 is rather similar to the operation of the mould of FIG. 1, except in the start of the operation. The plate 25 is placed on bottom 17 of the outer mould, and the shell 18 is placed in the outer mould so that only the lower part of the shell is below the upper edge of mould wall 16. Due to fact that the shell is springy—as explained before—it will remain in this position until it is pressed down. Then the cheese mass to be pressed is filled into the interior of the shell in a predetermined amount, plate 24 is placed on top of the cheese mass, and lid 23 is placed on the upper edge of shell 18. The whole mould with the cheese mass is then placed in a pneumatic cheese press as described in connection with the mould of FIG. 1, and pressure is applied to lid 23. The whey passes between plate 24 and the contacting part of lid 23, between plate 25 and bottom 17, between plates 27 and 28, and out between reinforcing edge 22 and edge part of lid 23. Size of pressure and period of pressing is about the same as mentioned in connection with the mould of FIG. 1. The amount of cheese mass filled into the mould is such that the cheese has obtained satisfactory pressing at the time when the shell 18 has been pressed to, or nearly to, the bottom 17.

Especially with the type of mould shown in FIG. 3 it is sometimes preferred to perform the last part of the pressing on the cheese after the same has been turned upside down inside the shell, which may help, if necessary, to secure a completely uniform drainage of whey from lower and upper parts of the cheese. Such turning of the cheese is performed easily and very fast on account of the fact that no cheese cloth has to be handled.

The invention is not limited to the specific embodiments described above, it being possible to make many modifications of the latter without deviating from the principle of the invention. So, for example, the outer moulds may be provided with loose bottoms which e.g. may be designed like the lid 23 in FIG. 3. If so desired several moulds may have a common bottom and common perforated bottom plate, and likewise a common lid and common perforated covering plate. If desirable, the outer mould in FIG. 3 may be provided with means for supporting the shell at a desired level during filling with cheese mass. Such means are well known in the art. The outer mould wall can, if so desired, have scattered, relatively large discharge holes for the whey. Such holes may e.g. have a diameter of 3 to 5 mm. and may be distributed over the whole area of the mould wall or their occurrence may be limited to one or more smaller areas. Numerous other variations and modifications may be made within the scope of this invention, and will be apparent to those skilled in the art.

I claim:

1. A cheese moulding apparatus comprising: an outer mould including side and bottom portions; a split shell slidably received in said outer mould and adapter to press against the interior of said side portion, said shell comprising at least two juxtaposed and rigidly interconnected plates, at least the plate facing the interior of the mould being finely perforated, and a drainage space being provided between said juxtaposed plates; and means for pressing cheese housed within the shell and outer mould, said means causing whey to drain between said plates.

2. The mould of claim 1 where at least one plate is provided with evenly distributed low elevations, said low elevations serving to define said drainage space.

3. The mould of claim 1 wherein said plates number two and wherein the inner plate is finely perforated, the outer face of the inner plate is provided with evenly distributed low elevations, and the outer plate is non-perforated.

4. The mould of claim 1 wherein said apparatus includes a loosely fitting perforated bottom plate supported by the interior of said bottom portion of said outer mould.

5. The mould of claim 1 wherein the shell is provided with an upper reinforcing split ring.

References Cited

UNITED STATES PATENTS

| | | | |
|---|---|---|---|
| 1,402,065 | 1/1922 | Griffin | 249—113 |
| 2,600,265 | 6/1952 | Randall | 249—113 |
| 2,636,422 | 4/1953 | Pierson | 249—112 X |
| 3,001,582 | 9/1961 | Kindseth et al. | 249—113 X |
| 3,023,468 | 3/1962 | Hord et al. | 249—113 X |
| 3,118,229 | 1/1964 | Rossen | 249—113 |

ROBERT D. BALDWIN, Primary Examiner

U.S. Cl. X.R.

249—113, 141